Patented Dec. 12, 1933

1,939,496

UNITED STATES PATENT OFFICE 1,939,496

DERIVATIVES OF DI- OR TRIMETHOXY- AND -ETHOXY-BENZOIC ACIDS AND PROCESS FOR THE MANUFACTURE OF SAME

Marcus Guggenheim, Basel, Switzerland, assignor to Hoffmann-La Roche Inc., Nutley, N. J., a corporation of New Jersey No Drawing. Application July 1, 1933, Serial No. 678,730, and in Switzerland July 1, 1932

4 Claims. (Cl. 260—124)

It has been found, that the dialkylamides of polyalkoxy-benzoic acids possess valuable therapeutic properties, inasmuch as they have a favorable action on the circulation and respiratory centre. Nebelthau (Archiv für experimentelle Pathologie und Pharmacologie, vol. 36, 1895, p. 460) and Harras (Archives Internationales de Pharmacodynamie et de Thérapie, vol. 11, 1903, p. 443 and 444) have already found that the dialkylamides of benzoic acid and of methoxy-benzoic acid have a stimulating effect on the respiratory centre. With the dialkylamides of the di- or trimethoxy-and-ethoxy-benzoic acids this stimulating effect is much stronger. This increased efficacity was not to be expected.

The derivatives of di- or trimethoxy-and-ethoxy-benzoic acids are prepared by transforming these acids in the usual manner into the dimethyl- and diethylamides respectively, the simplest method being to treat the halogenides of the acids with the dialkylamines.

Example 1

40.1 parts by weight of veratroylchloride are dissolved in 400 parts by weight of ether and poured into a solution of 29.3 parts by weight of diethylamine in 100 parts by weight of absolute ether. Diethylamine-hydrochloride is precipitated and after a few hours separated from the liquid. After evaporating the ether the remaining oil is distilled in vacuo. For further purification the distillate is dissolved in a little water, precipitated by the addition of potash, taken up in ether and after drying with potash once more distilled in vacuo, whereby the veratric-acid-diethylamide is obtained boiling under a pressure of 12 mm. at 205° C.

Example 2

20 parts by weight of veratroylchloride are dissolved in 300 parts by weight of toluene and poured into a solution of 9 parts by weight of dimethylamine in 150 parts by weight of toluene. Dimethylamine-hydrochloride is precipitated, which after a few hours is separated from the liquid. After removing the toluene by distillation, the residue is distilled in vacuo. The veratric-acid-dimethylamide is obtained under a pressure of 12 mm. at 203° C. as a colourless oil, which soon congeals. After recrystallization from petroleum-ether it is obtained in the form of colourless, shining crystalline needles, which melt at 102–103° C.

Example 3

51 parts by weight of 3, 4, 5-trimethoxy-benzoylchloride (Journ. Chem. Soc., vol 89, 1906, p. 1655) are dissolved in 150 parts by weight of toluene and poured into a solution of 20 parts by weight of dimethylamine in 200 parts by weight of toluene. After being left to stand for some time the precipitated dimethylamine-hydrochloride is separated and washed with toluene. The toluene is then removed by distillation and the residue distilled in vacuo. The 3, 4, 5-trimethoxy-benzoic-acid-dimethylamide is obtained under pressure of 13 mm. at 218° and crystallizes in the receiver. It is advantageously recrystallized from ether and thus obtained in colourless crystalline needles melting at 74° C.

Example 4

A solution of 54 parts by weight of 3, 4, 5,-trimethoxy-benzoylchloride (Journ. Chem. Soc. vol. 89, 1905, p. 1655) in 150 parts by weight of benzene is poured during 15 minutes into a solution of 35 parts by weight of diethylamine in 60 parts by weight of benzene. After being left to stand for some time the precipitated diethylamine-hydrochloride is separated, washed with benzene and the benzene-solution evaporated. The residue boils under a pressure of 13 mm. between 220 and 226° C. and slowly crystallizes. After recrystalization from petroleum-ether the 3, 4, 5-trimethoxy-benzoic-acid-diethylamide is obtained in white needles melting at 54° C.

Example 5

40 parts by weight of 2.3-dimethoxy-benzoylchloride, prepared by allowing thionylchloride to react with 2,3-dimethoxy-benzoic acid (Journ. Chem. Soc., vol. 123, 1923, p. 1575) are dissolved in 200 parts by weight of toluene and hereafter somewhat more than the calculated quantity of dimethylamine, dissolved in 400 parts by weight of toluene, is added. After a few hours' standing at room temperature the dimethylamine-hydrochloride is filtered off and the toluene distilled under reduced pressure. The amide stubbornly retains small quantities of impurities, for the removal of which it is dissolved in water, the solution treated with animal charcoal and the filtrate evaporated in vacuo.

The 2,3-dimethoxy-benzoic-acid-dimethylamide boils under a pressure of 12 mm. at 172° C. and forms a colourless viscous oil which mixes with water and easily dissolves in alcohol, ether or benzene.

Example 6

3-methoxy-4, 5-diethoxy-benzoylchloride, obtained by alkylating the 3-methylether of gallic aldehyde, which is prepared by the process of German patent specification 530,650, with diethylsulphate, oxidizing the product thus obtained with potassium-permanganate and allowing thionylchloride to react with the 3-methoxy-4,5-diethoxy-benzoic acid thus obtained, is treated in ethereal solution with 2 molecules of diethylamine, whereby the amide is obtained in almost quantitative yield. The 3-methoxy-4,5-diethoxy-benzoic-acid-diethylamide boils under a pressure of 12 mm. at 211-212° C., it forms a slightly yellowish viscous liquid, which is easily soluble in water and the usual organic solvents.

Example 7

The 3, 5-dimethoxy-4-ethoxy-benzoic-acid-diethylamide, obtained from 3,5-dimethoxy-4-ethoxybenzoylchloride, which is prepared by allowing thionylchloride to react with 3, 5-dimethoxy-4-ethoxy-benzoic-acid (Journ. Am. Chem. Soc., vol. 41, 1919, p. 801) and diethylamine is a viscous oil which boils under a pressure of 13 mm. at 213° C.

I claim:

1. The dialkylamides of polyalkoxy-benzoic acids forming colourless crystals or oils, easily soluble in water and the usual organic solvents, having an excellent stimulating action on the respiratory center..

2. The veratric-acid-diethylamide forming an oil boiling at 205° C. and under 12 mm. pressure, easily soluble in water and the usual organic solvents, having an excellent stimulating action on the respiratory centre.

3. The process for the manufacture of dialkylamides of polyalkoxy-benzoic acids, which consists in mixing polyalkoxy-benzoic-acid-halides with dialkylamines.

4. The process for the manufacture of veratric-acid-diethylamide, which consists in mixing veratric-acid-chloride with diethylamine.

MARCUS GUGGENHEIM.